United States Patent [19]
Mast et al.

[11] 3,815,345
[45] June 11, 1974

[54] HAY ROLL FORMING MACHINE

[75] Inventors: Aquila D. Mast, Lancaster; Edward T. Eggers, New Holland, both of Pa.

[73] Assignee: Sperry Rand Corporation, New Holland, Pa.

[22] Filed: Apr. 24, 1973

[21] Appl. No.: 353,947

[52] U.S. Cl. ............................................. 56/341
[51] Int. Cl. ............................................. A01d 39/00
[58] Field of Search .......... 56/341, 342, 343; 100/5, 100/71, 88

[56] References Cited
UNITED STATES PATENTS

| | | | |
|---|---|---|---|
| 2,096,990 | 10/1937 | Luebben | 100/88 |
| 2,581,542 | 1/1952 | Kolzing | 56/343 |
| 2,627,223 | 2/1953 | Berge | 100/88 X |
| 2,785,625 | 3/1957 | Wiseman et al. | 100/88 |
| 3,722,197 | 3/1973 | Vermeer | 56/341 |

*Primary Examiner*—Russell R. Kinsey
*Attorney, Agent, or Firm*—Joseph A. Brown; James J. Kennedy; C. Hercus Just

[57] ABSTRACT

A machine to form compact rolls of hay of substantial size by picking up a swath or windrow of hay and the like from a field, engage it by cooperating upper and lower endless flexible aprons driven in suitable directions to coil the hay into a compact roll while supported upon floor means mounted stationarily in the bottom of the machine to effect baling of all the hay without loss upon the ground. When the roll type bale of hay reaches a predetermined diameter, the upper apron raises and driving movement of the same stops while the bale is discharged by movement of the lower apron rearwardly in the machine, or the machine can retain and transport the bale to a desired location, if desired. The lower course of the upper apron is initially supported in a desired configuration relative to the lower apron by guide means which include movable auxiliary means arranged to be disengaged by said upper apron when the bale reaches a predetermined diameter.

7 Claims, 12 Drawing Figures

HAY ROLL FORMING MACHINE

BACKGROUND OF THE INVENTION

For many years, it has been customary to harvest forage crops, such as various kinds of hay and leaf-type forage plants by mowing the same in a field, letting them lie for several days to dry, forming the cut and at least partially dryed crop into windrows, and passing a hay-baling machine over and along such windrows to form the crop into rectangular bales which are secured by passing one or more tying strands around the bale. The bales then are picked up by various means and are taken to a barn or similar building in which piles of such bales are stored until used. In recent years, it has been found that if hay and similar forage crops are formed into a large, compact roll by various types of machines, the cylindrical formation of the roll tends to provide self-shedding of rain and other inclement weather substances if the roll is left lying in a field or feed lot where cattle and other herbivorous animals may feed upon it, without requiring the roll to be taken to a storage shed.

Large rolls of forage crops of the type described frequently are of the order of 4 or 5 feet in diameter and 6 or 8 feet long. Rolls of this size may weigh as much as several tons. If they are to be moved, following the formation thereof, special types of equipment must be used. The present invention is concerned with the formation of compact rolls of forage material, such as hay, and the details thereof are setforth hereinafter.

Forming compact, large rolls of hay has engaged the attention of various inventors heretofore. Several different principles have been utilized in the inventions thus produced. One type forms a roll or coil of hay and the like by initiating the formation of such roll by suitable mechanism and continue to roll a swath or windrow of the hay while supported upon the ground. Examples of such mechanisms are shown in prior U.S. Pat. No. 3110145, to Avery, dated Nov. 12, 1963. Another such machine comprises the subject matter of U.S. Pat. No. 3650100, to Swan, dated Mar. 21, 1972. One of the principle difficulties resulting from this method of forming rolls of hay is that a certain amount of the hay remains upon the field without being included in the roll of hay, such as the fines. Further, dirt, clods of earth, stones and the like also can be picked up by the roll and this is undesirable under certain circumstances.

A second principle method of forming rolls of the type referred to comprises a machine in which a swath or windrow of the crop is picked up from the field and directed onto a supporting conveyor or the like while the same is formed into a coil or roll of the forage crop and is out of contact with the ground, thus resulting in the formation of a cleaner type of roll or coil of hay, as well as the same including most if not all of the fines of the crop, thus minimizing waste. One example of a prior machine for forming a coil or roll of hay is illustrated in U.S. Pat. No. 3665690, to Wenger, dated May 30, 1972. The particular design of the machine shown in said patent offers a certain amount of friction between the roll and the supporting frame of the machine, which is undesirable, and another undesirable feature is that the coil of hay is formed upon a core member rather than being a free-form of roll which has no core or mandrel. The foregoing objectionable features are obviated in the design of machine comprising the present invention and a substantial number of improvements in the art of forming large sizes of compact rolls of hay and other forage crops are provided in said machine, details of which are as follows.

The improved features for a hay roll forming machine which comprise the present invention are part of a complete machine which has other novel and patentable features in addition to those of the present invention. Such other features comprise the subject matters of other related applications in which the instant inventors or others are the inventors. However, for purposes of providing a full understanding of the present invention and the benefits afforded the overall machine thereby, a description of the entire machine, or at least a substantial part thereof is set forth hereinafter relative to suitable drawings to illustrate the same, the present invention being described and shown in particular therein.

SUMMARY OF THE INVENTION

It is the principle object of the present invention to provide a machine for forming a compact roll of hay or similar forage crop of substantial diameter and length by providing means to pick up a swath or windrow of such crop by suitable means and feed it to a space between a flexible, endless lower apron movable relative to a bottom panel or floor, fixedly supported in the lower portion of the machine, and the lower course of an upper flexible apron initially being supported by auxiliary guide means which position it to initiate the formation of a coil of said forage crop upon the lower apron and continue to coil the same by rearward movement of the upper course of the lower apron and forward movement of the lower course of the upper apron, the upper apron also being guided around a series of rotatable idlers arranged to initially dispose the upper course of the upper apron in a circuitous pattern in which part of said apron is at least partially within the space in the machine within which the roll of hay or other crop gradually expands in size, and the machine also including means to place the upper apron under tension to cause it to constantly exert pressure upon the upper portion of the roll of hay or crop being formed while the upper course of the upper apron expands around the upper surface of the roll being formed, such expansion occurring against the action of take-up mechanism included in the machine and associated with said upper apron.

It is another object of the invention, ancillary to the foregoing object to dispose said lower course of the upper apron in a position relative to the upper course of the lower apron which defines a roll-forming space which is wedge shaped in cross-section, and said guide means for said lower course of said upper conveyor comprising auxiliary guide members which are movably supported at opposite sides of said machine and initially project into said wedge shaped space for engagement by said upper apron but, when the roll of forage crop reaches a predetermined diameter, said apron disengages said guide members and said members are pushed out of said space to prevent interference with said roll.

It is a further object of the invention to mount said auxiliary guide members for the lower course of said upper apron for movement into openings in side panels, fixed to opposite sides of said machine, against the action of spring means which normally extend into said wedge shaped space, whereby after a roll of forage crop has been discharged from said machine, said spring means automatically restore said auxiliary guide members to operative projecting positions for engagement by said lower course of said upper apron.

Ancillary to the foregoing object, it is another object of the invention to form said upper apron from a pair of endless link-type chains between which a series of transverse members extend in evenly spaced arrangement longitudinally of said chains, said auxiliary guide members having rounded upper edges slidably engaged by the links of said chains with minimum friction and wear.

It is a further object of the invention to support the upper apron of the machine upon an auxiliary, upper frame pivotally connected at one end to a base frame on said machine, said upper frame having a portion of the supporting means for said upper apron fixed thereto, said upper frame being adapted to have the rearward portion thereof raised to discharge a roll of forage crop from the machine when it has reached maximum desired size, the lower course of said upper apron being extended above said roll when the upper frame is raised to discharge said roll and the chains of said lower course of said upper apron reengage said guide members therefor when said upper frame is lowered to operative position.

Details of the foregoing objects and of the invention, as well as other objects thereof, are setforth in the following specification and illustrated in the accompanying drawings comprising apart thereof.

DETAILED DESCRIPTION

Figure 1:
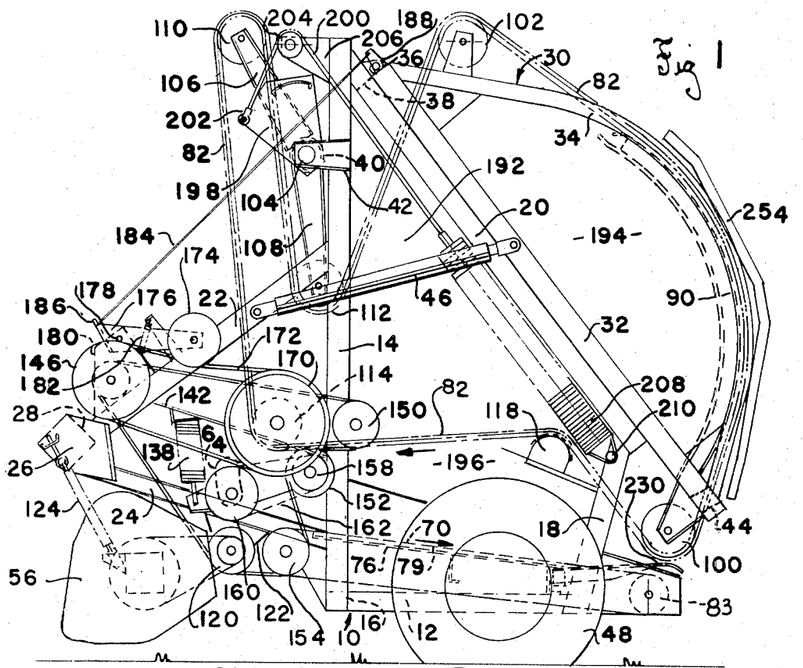
FIG. 1 is a side elevation of a hay roll forming machine embodying the principles of the present invention and showing the various parts thereof in the position thereof for starting the formation of a hay roll, the upper apron being illustrated in compact or contracted position.
Figure 2:
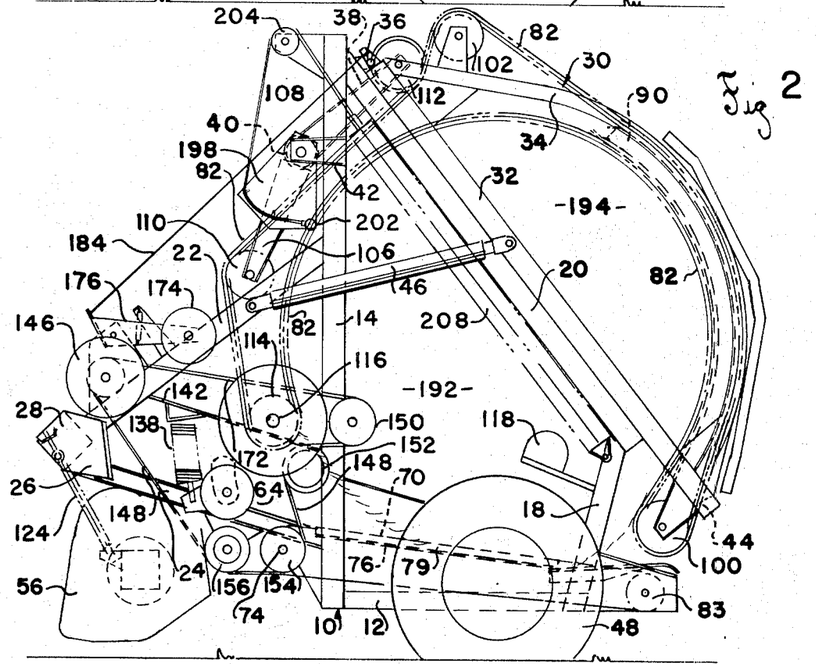
FIG. 2 is a view similar to FIG. 1 but showing the parts of the machine positioned substantially at the conclusion of forming a maximum size of hay roll.
Figures 3, 4, 5:
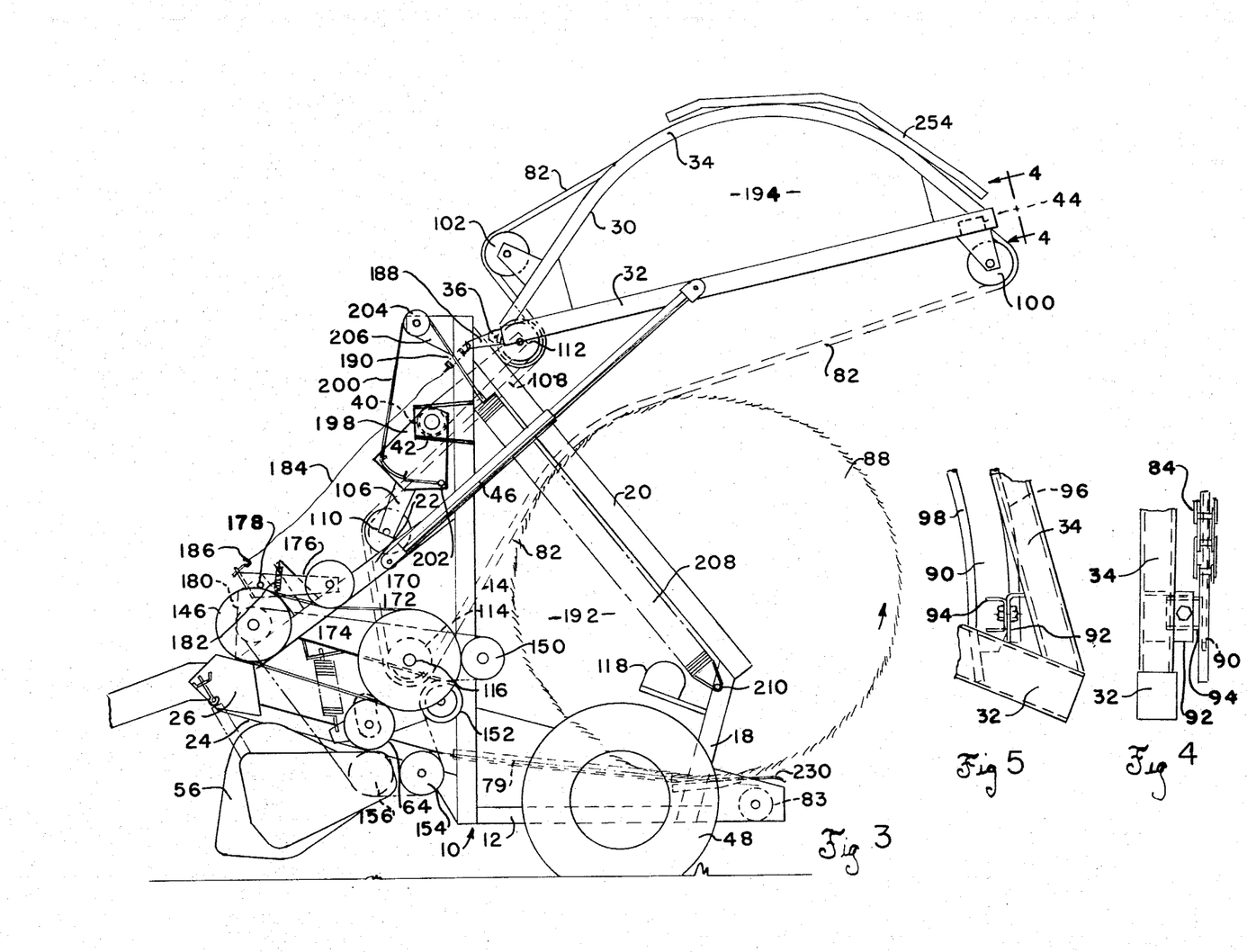
FIG. 3 is a side elevation of the machine with the parts thereof illustrated in discharge position.
FIG. 4 is a fragmentary end view of a portion of the structure as seen on the line 4—4 of FIG. 3.
FIG. 5 is a fragmentary side elevation of the portion of the machine shown in FIG. 4.

Referring to FIGS. 1-3, the machine illustrated therein comprises a base frame 10 which has similar side arrangements of structural members fixedly connected together, such as by welding or the like. Each side of said frame comprises a bottom horizontal member 12. The forward end thereof is connected to a vertical member 14 of substantial height. Also, extending perpendicularly to the junction of members 12 and 14 is a cross member 16, the adjacent end of which is fixedly connected to the junction of members 12 and 14. A short frame member 18 extends upwardly from the rearward portion of bottom member 12 and the upper end thereof is connected to one end of an upwardly and forwardly extending angular brace member 20 which is connected at it's upper end to the upper end of vertical member 14. Extending forwardly from the front face of member 14 at each side of the machine is an A-frame consisting of angularly related members 22 and 24, the rearward ends of which are fixed to the front face of vertical member 14 and the forward ends thereof are connected together and also are attached to polygonal plates 26, said plates also being fixed to and covering the outer ends of a horizontal cross member 28. The various frame members thus far described, which comprise the base frame 10, may be formed from heavy structural tubing, channels, or any other appropriate structural form commonly employed in framing of the type described.

An auxiliary or upper frame 30 also is provided which consists of side frames composed of a straight frame member 32, the ends of which are connected to the opposite ends of an arcuate frame member 34. The uppermost portion of each side frame member is pivotally connected at 36 to a suitable bearing fixed to the upper end of vertical frame member 14 of the base frame, as clearly shown in FIGS. 1-3. A suitable cross frame member 38 also extends between the upper ends of angular brace members 20 of frame 10 and thereby stabilizes the connection of the upper frames 30 at opposite sides thereof by the pivotal connections 36 to the uppermost end of the base frame 10. The upper end of base frame 10 also is further stablized transversely by means of another cross tube 40, or similar horizontal bracing member which extends between bearing brackets 42 which are connected to the front faces of the vertical frame members 14 such as by welding.

The lower rearward end of upper frame 30, as viewed in FIGS. 1 and 2, also has a cross frame member 44 extending between the opposite side frame means composed of members 32 and 34.

Upper frame 30 is moved between it's lower, operative position such as shown in FIGS. 1 and 2, and its extended, or discharge position, as shown in FIG. 3, by means of a pair of hydraulic cylinder and piston units 46, the opposite ends of which respectively are connected to the members 22 and 32 of base frame 10 and upper frame 30, intermediately of the ends thereof, as shown in FIGS. 1-3. Suitable hydraulic lines, of conventional type, not shown, are connected to opposite ends of the cylinder of each unit 46 and said units at opposite sides of the frame operate simultaneously under all circumstances.

Figure 6:
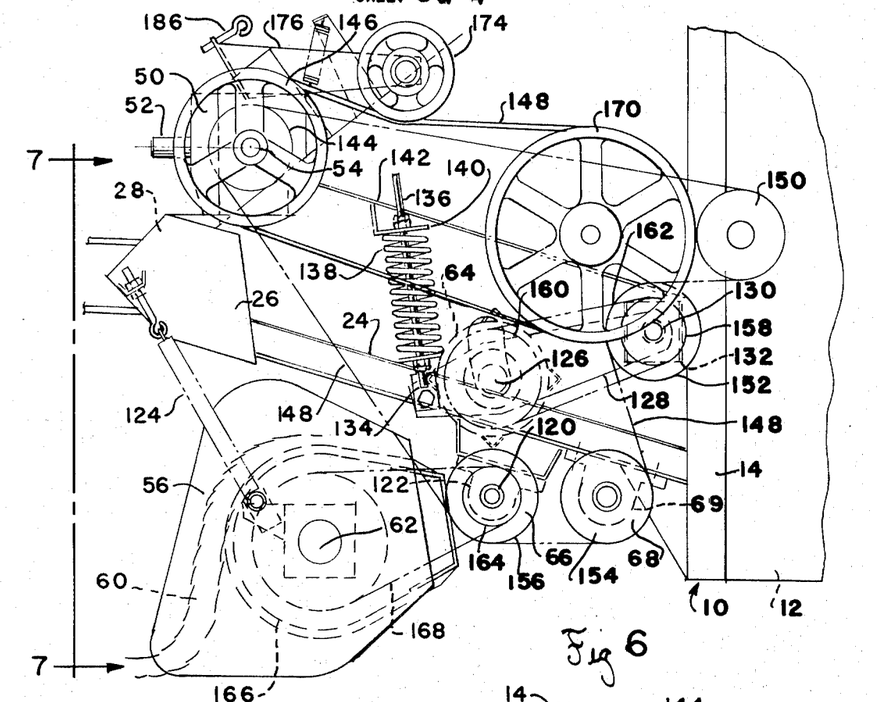
FIG. 6 is a fragmentary side elevation showing, on a scale larger than in the preceding figures, portions of the drive mechanism and control means incorporated therewith.

As will be seen from FIGS. 1–3, the base frame 10 has a pair of conventional wheels 48 connected thereto at opposite sides of the frame, by any suitable axle means, not shown but of appropriate conventional type, in order that the hay roll forming machine comprising the present invention may be drawn by a tractor or other similar implement over a field for purposes of forming a roll of hay or similar forage material. Referring to FIG. 6, the forward end of the machine has an appropriate gear box 50 interconnected to suitable transverse supporting means, including the cross member 28 for example. The gear box has an input shaft 52 which is connectable to the driven end of a power take-off unit (p.t.o.) provided on and extending rearwardly from a suitable tractor unit or equivalent power mechanism. A power output shaft 54 extends from the gear box 50 to one side of the machine as viewed in FIGS. 1–3 and 6.

Figure 7:
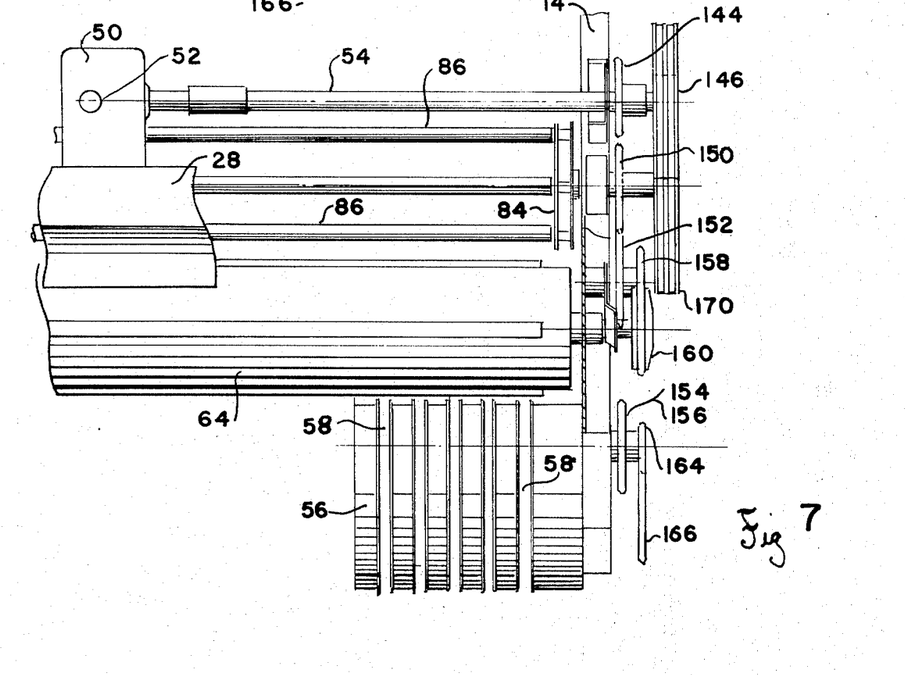
FIG. 7 is a fragmentary front view of the portion of the machine shown in FIG. 6.

Extending forwardly from the front end of base frame 10 is a pick-up header unit 56 of a type adapted to engage, elevate from a field and rearwardly feed a swath or windrow of forage material which is in at least semi-dried condition. A fragmentary illustration of the forward portion of the header 56 is shown in FIG. 7. It comprises a drum having a series of transversely spaced, circular slots 58 therein, through which a series of spring fingers, not shown, but of conventional agricultural nature as in U.S. Pat. No. 2,581,542, extend for purposes of picking up a swath or windrow 60 of at least semi-dried forage material, as shown in FIG. 6, for purposes of moving the same to the entrance end of the machine. Said spring fingers are driven by a shaft 62, in clockwise direction, by means to be described, for purposes of elevating and feeding the material between a pair of compressing rollers 64 and 66, for purposes of leveling and preferably somewhat spreading transversely the swath or windrow which passes there between.

The flattened and somewhat spread material then passes to the entrance end of the lower apron which extends around driven roller 68, which is supported upon a shaft extending between bearings 69 respectively mounted upon the members 24 at opposite sides of the base frame 10, as clearly shown in FIG. 6. The compressing rollers 64 and 66 also are supported upon two transverse shafts, the opposite ends of which respectively are supported in suitable bearings which also are mounted upon the members 24 of the base frame at opposite sides of the machine, as best shown in FIG. 6.

Figures 8, 9, 10, 11, 12:
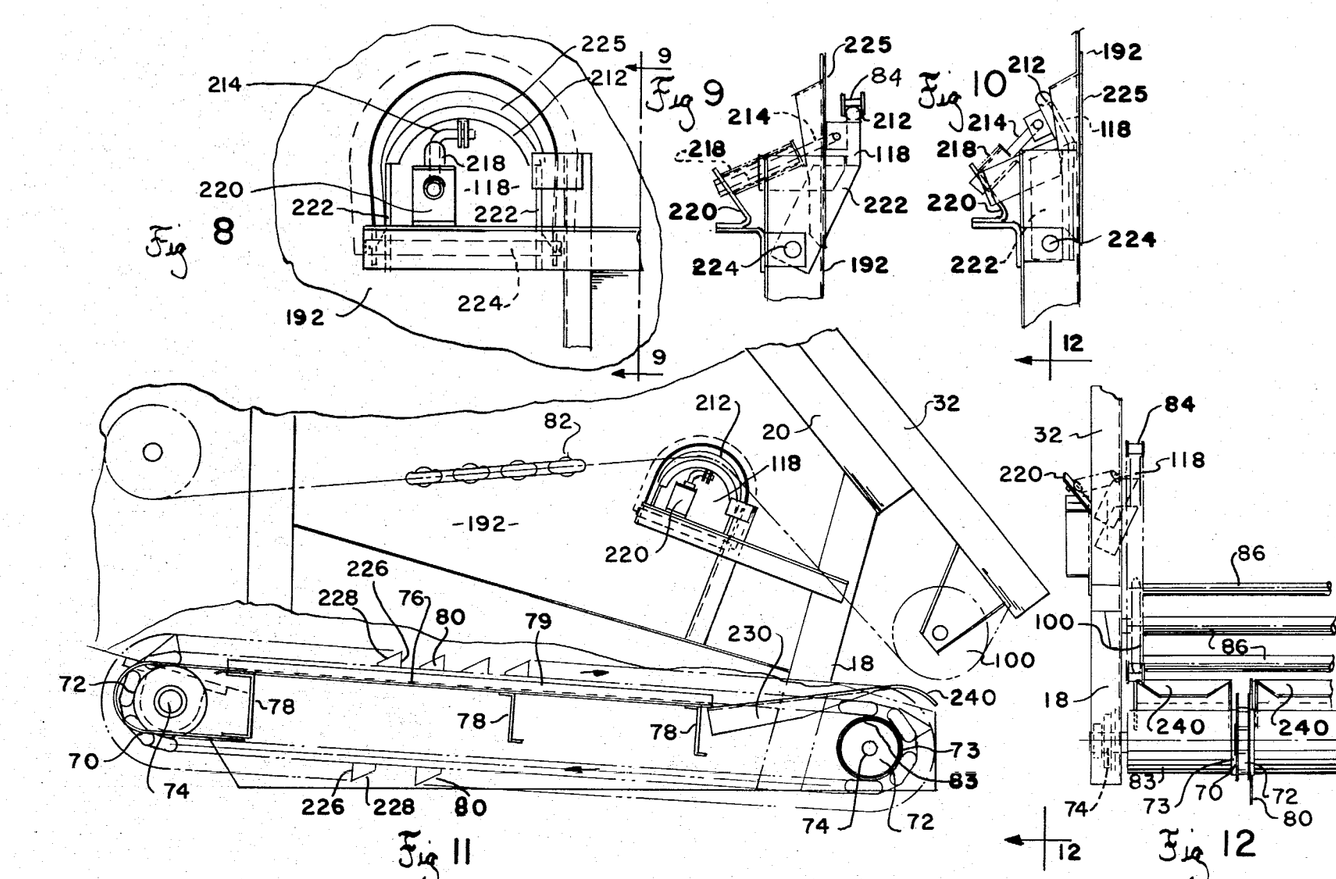
FIG. 8 is a fragmentary side elevation on a larger scale than in FIGS. 1-3 and showing supplemental guide means for the upper apron.
FIG. 9 is a fragmentary end view of the detail of the machine shown in FIG. 8 as seen on the line 9—9 thereof, said figure also illustrating portions of the mechanism in normal, operative position.
FIG. 10 is a view similar to FIG. 9 but showing said portions of the machine in released, inoperative position.
FIG. 11 is a fragmentary, partially diagrammatic view illustrating the function of the portion of the machine shown in FIGS. 8-10 in association with the floor or bed of the machine and the lower apron thereon.
FIG. 12 is a fragmentary end view of the portion of the machine shown in FIG. 11 as seen on the line 12—12 thereof.

The lower apron propelling means preferably comprises a series of endless, flexible chains 70, see FIG. 11, which are transversely spaced apart even distances and one end of the upper courses extend around sprocket gears 72 which are mounted upon a shaft 74 rotatably supported adjacent the forward end of the bottom or floor 76 which is fixedly connected to the base frame 10. The other end of the upper courses of chains 70 extend around cylindrical guide surface 73 fixedly supported by frame tube 83 adjacent the rear end of bottom 76. The floor is rendered rigid by a series of transversely extending bars 78, the opposite ends of which are suitably interconnected to the bottom horizontal members 12 of base frame 10 for example. The upper courses of the chains 70 preferably slide along guide channels 79 fixed to the upper surface of the bottom 76.

Referring to FIGS. 11 and 12, it also will be seen that the alternate links of the chain 70 have what is termed aggressive lugs or blades 80 connected thereto. In view of the fact that the upper courses of the chains 70 move in the direction of the arrows shown in FIG. 11, it will be seen that the forward edge of the lugs or blades 80 extends substantially perpendicularly to the axis of the chain, and the upper edge of each lug or blade slopes rearward and downward. Such arrangement not only facilitates rotary movement of a roll of hay or the like in counter-clockwise direction as viewed in FIGS. 1–3, but such engagement of the perpendicular forward edges of the lugs or blades 80 with the roll tends to dispose the stems and fibers of the forage material substantially circumferential, whereby there is a substantial tendency for the completed roll to shed rain and other inclement weather substances when lying in a field for example.

The upper frame 30 and certain guide rolls and sprockets which augment the same support the upper apron 82, which is shown in outline form in FIGS. 1–3. Said apron preferably comprises a pair of endless, flexible link-type chains 84, fragmentary examples of which are shown in FIGS. 4, 7, and 12. At longitudinally spaced intervals of suitable dimension, such as of the order of 8 or 10 inches, a series of bars 86 extend between said chains for substantially the full width of the machine. Fragmentary examples of such bars are shown in FIGS. 7 and 12. In cross section, the bars may be square or any other suitable geometric shape, such as cylindrical, for purposes of offering resistance to bending of the bars, especially when engaging the periphery of a roll of hay 88, an example of which is shown in exemplary manner in FIG. 2. The upper apron 82 is supported upon various guide rolls and sprockets, and the edges of guide bars, as follows.

Referring to FIGS. 4 and 5 in particular, it'll be seen that, adjacent each side of upper frame 30, and spaced inwardly therefrom, is an arcuate bar 90 which is appropriately connected to the arcuate frame member 34 at each side of the upper frame 30 by suitable brackets 92 and 94 respectively fixed to members 34 and bars 90, and bolted together as shown in FIGS. 4 and 5. The opposite edges of the arcuate bars 90 are rounded to strengthen the same and also minimize wear. The outer edge 96 is convex, and the inner edge 98 thereof is concave. Referring to FIGS. 1–3, the arcuate bars 90 are not shown but it will be understood that the same conform generally to the shape of the arcuate frame members 34 and the upper course of the chains 84 of upper apron 82 slideably engages the convex edge 96 of each of the arcuate guide bars 90.

At each side of the upper frame 30 at adjacent opposite ends thereof, suitable guide sprockets 100 and 102 respectively are supported by clevises which are connected to the opposite ends of the arcuate member 34 at each side of the frame. Affixed to ends of shaft 104, which is supported in bearing brackets 42 adjacent the upper end of vertical frame members 14, are pairs of oppositely extending arms 106 and 108. Said arms respectively comprise take-up and expansion means for the upper apron 82 and operate as a pivoted supplemental frame. The ends of said arms support rotatable guide sprockets 110 and 112 adjacent the opposite ends of the arms and the chains 84 of the upper apron 82 extend therearound in the manner shown in FIGS. 1–3. Lastly, a driving sprocket 114 is provided at each side of the main frame and connected to a driven shaft 116 that is supported in appropriate bearings fixed relative to the main frame 10. The chains 84 of the upper apron 82 also extend around said driving sprockets. The lower course of the upper apron 82 also slideably extends over the upper curved surface of movably mounted auxiliary guide members 118, details of which are best shown in FIGS. 8–11 and are described hereinafter as the major feature of this invention.

The pick-up header unit 56 is pivotally supported at its rearward end upon a shaft 120 which is rotatably supported at its opposite ends in bearings 122 connected to frame members 24 at opposite sides of the machine. The forward end of the pick-up header unit 56 is yieldably restrained against downward movement by a pair of springs 124 respectively connected at one end to the cross member 28 of the frame of the machine and, at the other end, being connected to end plates on the header 56 at opposite ends thereof. If desired, auxiliary wheels, not shown, may be rotatably mounted at opposite ends of the header unit 56 for engagement with the ground.

Upper compression roll 64 is supported by a shaft 126, the opposite ends of which are rotatable in bearings formed in arms 128, best shown in FIG. 6, the rearward end of said arms being supported upon pivot shafts 130 mounted in bearing brackets 132 which are fixed to vertical frame members 14. The opposite ends of arms 128 respectively at the opposite sides of the machine have clevises 134 connected thereto and a rod 136 extends upward from each clevis and is surrounded by a compression spring 138 which extends between each clevis 134 and a bracket 140 which is connected to a side plate 142 on each side of the machine.

DRIVE MECHANISM

As setforth above, power for the machine is derived from a p.t.o. of a tractor or the like, which is connected to shaft 52. Power output shaft 54 has a sprocket gear 144 connected to the outer end thereof as shown in FIGS. 6 and 7. Shaft 54 also extends beyond the outer end of sprocket gear 144 and has a large multiple sheave 146 fixed thereto. A sprocket chain 148 extends around sprocket gear 144 which comprises a driving sprocket. Chain 148, which is driven by sprocket gear 144 extends around idler sprocket gear 150 which is supported in a bearing on frame member 14. Chain 148 then extends around sprocket gear 152, another sprocket gear 154, and a further sprocket gear 156, from which the chain extends to the driving sprocket gear 144. Accordingly, all of the moving elements of the machine, with the exception of upper apron 82, are driven by the sprocket chain 148.

Another sprocket gear 158, of smaller diameter than sprocket gear 152, is fixed to one end of pivot shaft 130 for support thereby and a driven sprocket gear 160 is fixed to shaft 126 of the upper compression roller 64 to drive the same by means of a sprocket chain 162 which extends around the sprocket gears 158 and 160. The various vertical planes within which the pairs of driving and driven sprocket gears are located are best illustrated in FIG. 7.

Sprocket gear 156 is a driving gear for the smaller sprocket gear 164 which is connected to shaft 120 and is in the same plane as the larger driven sprocket gear 166. Sprocket chain 168 extends around the gears 164 and 166 and thereby effecting rotation of shaft 62 which drives the pick-up fingers of the header unit 56 which operate within in the circular slots 58 thereof.

The power output shaft 54 also supplies the power for driving the upper apron 82. This is accomplished by the multiple sheave 146 which is connected to the outer end of shaft 54, as indicated above, and a driven multiple sheave 170. A series of V-belts 172 extend around the multiple sheaves 146 and 170 in a loose condition, whereby the same comprise part of what may be considered a clutch arrangement. Multiple belt-tightening sheaves 174 are supported rotatably on the outer end of arm 176 which is pivoted at 178 to a bracket plate 180. A tension spring 182 is mounted in a manner to normally elevate the tightening sheaves 174 to inoperative position.

The purpose of the clutch-type arrangement described immediately above is to stop the movement of upper apron 82 when the upper frame 30 is moved to the elevated, discharge position thereof shown in FIG. 3. When this occurs however, the lower apron comprising the chains 70 continue to move in a direction to expel the completed roll 88 of hay or the like from the machine. Such continued movement of the lower apron is effected by driven sprocket 154 which is connected to the outer end of the shaft which supports the sprocket gears 72 for the chains 70.

Operation of such clutch mechanism is effected by the position of the tightening sheaves 174 with respect to the belts 172. Movement of the arm 176 in a direction to cause the sheaves 182 to tighten the belts 172 is effected by a cable 184, one end of which is fixed to eyelet 186 on the forward end of lever 176 and the opposite end of the cable is connected to a short arm 188 which projects outwardly from the frame member 32 of upper frame 30, as best shown in FIGS. 1 and 3. If desired, a spring 190 of predetermined tension strength is connected between said other end of cable 184 and the arm 188, as shown in FIG. 3. By comparing FIGS. 1 and 3, it'll be seen that in FIG. 1, the cable 184 is under tension by reason of the position of arm 188 on upper frame 30, whereby the tightening sheaves 174 are in tigthening engagement with the belts 172 and thereby cause driving of the driven sheaves 170 by the driving sheaves 146, thus moving the upper apron 82 at a predetermined speed which, under preferred conditions, is slightly slower than the surface speed of the chains 70 of the lower apron. By way of example, it has been found that the difference of about five per cent is highly useful, whereby there is a tendency for the slightly faster moving lower apron chains 70 to urge the roll toward the discharge end of the machine but in view of the lowered position of the upper frame 30 during the formation of the roll, there is no possibility for the roll to discharge from the machine prematurely. As shown in FIG. 3, when the upper frame 30 is elevated to discharge position, the cable 184 goes slack and the spring 182 raises the tightening sheaves 174 to idle position, thus stopping the movement of the upper apron 82.

UPPER APRON EXPANDING MECHANISM

Reference is made to FIGS. 1 and 2 in which the starting and final positions of the upper apron 82 are illustrated to best advantage. When a roll of hay or the like is first initiated, the swath or windrow 60 of the material is delivered to the forward end of the lower apron comprising the chains 70. Referring to FIG. 1, it'll be seen that the initial position of the lower course of the upper apron 82 extends over the auxiliary guide members 118 at opposite sides of the inner surfaces of the side plates 192 of the machine which extend between and are fixed to the vertical frame member 14, diagonal brace members 20, frame members 18 and horizontal bottom members 12, as well as between the angularly disposed frame members 22 and 24. Also, there are additional side plates 194 which extend across the major portion of the space defined by the frame members 32 and 34 of upper frame 30. Such side plates 192 and 194 confine the opposite ends of the roll 88 of hay or the like while it is being formed. From FIG. 1, it will be seen that the initial part of the roll of hay or the like which is being formed, occurs in a wedge shaped spaced 196 which is less high at the forward end than at the rearward end and is defined at the top by the lower straight course of the upper apron 82 between sprockets 114 and auxiliary guide members 118, and the upper course of the lower apron comprising chains 70. The shape of this space greatly facilitates the commencement of the rolling of the material, especially the smaller entrance end of the space 196, such rolling of the material occuring by virtue of the opposite directions in which the lower source of upper apron 82 and the chains 70 move as illustrated by direction arrows shown in FIG. 1. When this occurs, the upper apron 82 is in an N-shaped, compactly contracted position. In this position, it'll be seen that a substantial length of the apron which extends from sprockets 110, down and around sprockets 112 and up to sprockets 102 is disposed at least somewhat within the space ultimately occupied by the roll 88 of material which is confined by the circular configuration of the lower course of the upper apron 82, as illustrated in FIG. 2. Movement of the upper apron 82 between the contracted, starting position shown in FIG. 1 and the expanded, final position shown in FIG. 2 is controlled by mechanism connected to the opposite ends of shaft 104 upon which ends the arms 106 and 108 are fixed. Such control mechanism comprises a pair of similar cam plates 198 that respectively are fixed to the opposite ends of shaft 104 and extend radially therefrom. A cable 200 is connected at one end to a pin 202 on the cam plates 198. From there, the cable extends around a guide pulley 204 which is supported on a bracket arm 206 that is fixed to the upper end of vertical frame 14. It will be understood that each of the members 14, at opposite sides of the machine, support a bracket arm 206 and guide pulley 204, as well as there being a cable 200 at each side of the machine. The other end of cable 200 is connected to one end of a very strong tension spring 208, the opposite end of said spring being anchored to a pin 210 on frame member 18 at each side of the machine. The arrangement just described results in the lower course of upper apron 82 exerting substantially constant pressure upon a coiled roll of hay or the like while it is increasing in size.

As the roll of hay or the like increases in diameter due to the coiling thereof within the initial space 196 shown in FIG. 1, the lower course of upper apron 82 between sprockets 114 and guide members 118 will gradually be raised by the roll, with the result that the lower courses of said apron will be lifted from the auxiliary guide members 118. As described hereinafter, said auxiliary guide members will be retracted into accomodating spaces in the side plates of the machine so as not to interfere with the movement of the ends of the roll 88 of hay and the like which is being formed. Also, such upward movement of the lower course of the apron 88 will require an extension of the amount of such lower course which is in engagement with the upper surface of the roll 88 of material. Such expansion in said lower course is provided by counter-clockwise rotation of the arms 106 and 108, as viewed in FIGS. 1 and 2. Such rotation is resisted by the springs 208 at opposite sides of the machine and this results in suitable compression force being applied to the roll 88 to render it compact. Also, when the lower course of the upper apron 82 has reached its maximum expanded position, as illustrated in FIG. 2, the chains of said lower course will ride upon the concave edges of the arcuate guide bars 90 respectively fixed to the arcuate frame members 34 of upper frame 30, whereby said lower course of the upper apron will in no way interfere with the movement of the upper course of said apron, as can be clearly seen from FIG. 2 which is the position in which the upper and lower courses thereof will approach each other most closely.

Due to the tension constantly exerted by the springs 208 upon the arms 106 and 108 and especially upon the guide sprockets 110 and 112 respectively carried thereby, engagement of the chains of the upper apron 82 with the various guide sprockets for the same will be maintained at all times. Further, due to the fact that the chains at opposite sides of the upper apron 82 will mesh with the driving sprockets 114 respectively fixed to the opposite ends of shaft 116, there will be no tendency for variation occurring in the movements of the chains at opposite ends of the upper apron and thus the bars 86 of the upper apron will be maintained constantly parallel to the axes of the various shafts extending between opposite sides of the machine.

It also will be seen especially from FIGS. 1 and 2 that even though there is the possibility for the upper apron 82 to expand around a relatively large diameter of roll 88 of material, such as of the order of as much as 6 or 7 feet, it will be seen that at no time is the upper apron disposed in any outwardly extending position of great extent, whereby the disposition of said upper apron is substantially compact at all times.

AUXILIARY GUIDE MEMBERS

Referring to FIGS. 8–11, details of the auxiliary guide members 118 are illustrated. Said guide members are highly essential to the present invention, especially to the formation of the wedge shaped space, described in detail above which, during the initial formation of the roll of hay 88 is between the lower most course of upper apron 82 and the upper courses of chains 70. After members 178 have served their intended function, they then would be an obstruction to continued expansion of the roll 88. Retraction thereof is provided for by mechanism described hereinafter, thereby obviating any obstructive tendencies toward the enlargement of the roll of hay.

From FIGS. 8–11, it will be seen that the members 118 have a rounded, arcuate upper surface 212 which is slidably engaged by the chains 84 of the upper apron 82 with a minimum of friction. Normally, the members 118 are maintained in the projecting or extended position such as shown in FIG. 9. This position is maintained by a shaft 214 which is pivotally connected at one end to ear means 216 which project from the inner surface of each member 118. A compression spring 218 surrounds the shaft 214 and normally urges each member 118 to its projected position such as shown in FIG. 12, which disposes the members within the space occupied by roll 88 when the same reaches a predetermined diameter. Spring 218 extends between a washer fixed to shaft 214 and a bracket 220 which is supported by a suitable angle member connected to the exterior surface of the side plates 192 at opposite sides of the machine. Each member 118 also has a pair of parallel legs 222 which are pivotally supported by horizontal shaft 224 which is suitably connected to each side plate 192. Said side plates also each have an appropriate opening 225 formed therein through which the members 118 move to the retracted positions shown in FIG. 10, against the compressive force of spring 218.

The members 118 at opposite sides of the machine are forced from the projected position of FIG. 9 to the retracted position of FIG. 10 by slidable engagement of the members 118 by the opposite ends of the roll 88 of hay or the like which, in the areas of members 118, are moving upwardly. Hence the upwardly sloping surfaces of members 118 facilitate movement thereof to said retracted positions by the ends of the rolls 88. Members 118 also will be maintained in said retracted position as long as the roll 88 of hay remains in the machine, thereby offering no impedence to rotation of the roll. However, incident to discharge of a roll 88, the upper frame 30 is raised to the position shown in FIG. 3 and this results in the lower course of the upper apron carried thereby being extended far above members 118. Accordingly, the springs 218 promptly restore members 118 to their projecting positions shown in FIG. 9. Thus, when upper frame 30 and upper apron carried thereby are restored to the lower, operative positions thereof, the lower course of the upper apron 82 will automatically engage the same for support incident to the apron 82 forming one boundary of the wedge shaped space 186.

DISCHARGE OPERATIONS

When the roll 88 of hay or the like has reached either a desired or maximum diameter capable of being formed by the machine, the operator of the tractor actuates a valve, not shown, to intorduce fluid by conventional means to one end of the cylinder units 46 and thus effect raising of the upper frame 30 from the position shown in FIGS. 1 and 2 to the discharge position shown in FIG. 3. As described above, such movement releases the tightening sheaves 174 from the belts 172 and thus disconnects driving power from the upper apron 82. However, rearward movement of the upper courses of the chains 70 comprising the lower apron continues from the driving imparted to shaft 74 by sprocket gear 154. Referring particularly to FIGS. 11 and 12, it will be seen that on alternate successive links of the chains 70, the lugs or blades 80 are provided to effect positive engagement between the chains 70 and the lower surface of the roll 88 of the material being formed into a roll. During such formation, the roll will be rotated in the direction of the arrow illustrated in exemplary manner in FIG. 3. The shape of the lugs or teeth 80 also is important. They may be considered to be of an aggressive nature. The lugs on the upper course of the chains have a substantially perpendicular leading edge 226 and a downward and rearward sloping upper edge 228, considered relative to direction of movement of said lugs in the upper course of the chains 70, as shown in FIG. 11 and as indicated by the directional arrows therein. Not only is the function of the lugs 80 to firmly and aggressively engage the lower surface of the roll 88 of material but the concentrated engagement of all of the lugs 80 on all of the chains 70 with the lower surface of the roll 88 results in orientation of the stems and fibers of the agriculture forage crops being formed into the roll so that the same extend circumferentially throughout the roll and, when the roll is left in a field for feeding of stock or the like, such rolls have a substantal tendency to shed rain and other inclement weather substances in a highly satisfactory manner.

For safety and protection, the upper frame 30 also is provided with outer cover plates 254 which at least partially extend around and between the arcuate frame members 34 of upper frame 30.

From the foregoing, it will be seen that the present invention provides a highly versatile machine for forming large sizes of compact rolls of agriculture forage material out of contact with the ground, thus minimizing waste of the material being harvested and also keeping the rolls in clean condition and relatively free from dirt, stones and other undesirable material which may occur in fields from which the crop is being harvested. All moving elements of the machine are power driven in a manner which achieves maximum efficiency. Further, the upper apron is arranged and supported by mechanism which permits substantial expansion of the lower course of the apron from an initial position controlled by auxiliary guide means which comprise an important part of the present invention, to gradually expanding positions in which the upper surface of the roll being formed has pressure exerted upon it by the lower course of the upper apron. The expansion takes place automatically and such pressure is applied constantly to the upper surface of the roll, especially after the roll increases to a diameter greater than the distance of said auxiliary guide means above the lower apron.

While the invention has been described and illustrated in its several preferred embodiments, it should be understood that the invention is not to be limited to the precise details herein illustrated and described since the same may be carried out in other ways falling within the scope of the invention as illustrated and described.

We claim:

1. A mobile hay roll forming machine comprising in combination a frame, wheels mounted upon said frame to render said frame mobile over a swath of hay lying upon a field to form the same into a compact roll, pickup means operable adjacent the forward portion of said frame to pick up said swath, an endless lower flexible apron supported by a lower portion of said frame and having an upper course extending substantially horizontally therein and positioned to receive at the forward end thereof hay picked up from a field by said pickup means, drive means supported by said frame and connected to said lower endless flexible means to move said upper course thereof rearwardly to support a roll of hay thereon as the same is being formed during operation of said machine, an endless upper apron, supporting means on said frame for said upper apron arranged to position the lower course of said upper apron above said upper course of said lower flexible apron and spaced therefrom to define an initial roll-forming cavity between said courses of said aprons, said supporting means including guide members positioned adjacent opposite sides of said frame and engageable with opposite edges of said lower course of said upper apron to define a portion of said roll-forming cavity of a pre-determined height substantially less than the diameter of a roll of hay of ultimate maximum size to be formed in said machine, and said supporting means for said upper apron including yieldable means operable to permit said lower course of said upper apron to be raised from said members when the diameter of said roll increases beyond the height of said initial roll-forming cavity.

2. The machine according to claim 1 in which said upper apron comprises a pair of endless link-type chains defining opposite edges thereof and having similar elongated members extending therebetween and connected thereto at evenly spaced locations along said chains, said guide means of supporting means projecting inwardly from the opposite sides of said machine a sufficient distance to be engaged respectively by said chains.

3. The machine according to claim 2 in which said guide members have smoothly rounded upper edges engaged slidably by said chains.

4. The machine according to claim 2 further including means movably interconnecting said guide members of said supporting means to opposite sides of said frame of said machine to permit said members to be movable away from said chain-supporting positions thereon to retracted positions when the diameter of a roll of hay is great enough to cause the ends of said roll to engage said members.

5. The machine according to claim 4 further including spring means engageable with said guide members and operable normally to urge said members outwardly from said sides of said frame of said machine to chain-supporting position and said spring means being yieldable to permit movement of said members to said retracted positions.

6. The machine according to claim 5 in which said machine includes side plates carried by opposite sides of said frame and having openings therein complementary in size to said guide members and said guide members being pivotally interconnected to said frame adjacent the lower edges of said guide members for movement relative to the lower edges of said openings and said guide members when engaged by the ends of a roll of hay being moved thereby into said openings to dispose said members in noninterfering position relative to said roll while being formed within the space between said side plates.

7. The machine according to claim 4 in which said guide members extend upwardly and inwardly relative to the sides of said frame to provide camming surfaces engageable by upwardly moving portions of the ends of a roll of hay while being rotated and coiled within said roll-receiving cavity, thereby moving said guide members from said chain-supporting positions thereof to said retracted positions when said ends of said roll of hay engage said members.

* * * * *